United States Patent [19]

Blahut

[11] Patent Number: 5,418,559

[45] Date of Patent: May 23, 1995

[54] MULTI-CHANNEL TELEVISION CONVERTER FOR CONVENTIONAL AND INTERACTIVE SIGNALS

[75] Inventor: Donald E. Blahut, Holmdel, N.J.

[73] Assignee: AT&T Corp., Murray Hill, N.J.

[21] Appl. No.: 965,492

[22] Filed: Oct. 23, 1992

[51] Int. Cl.6 .............................................. H04H 1/02
[52] U.S. Cl. ...................................... 348/10; 455/4.2; 455/6.2; 348/12
[58] Field of Search .................... 348/6, 10, 11, 12, 13; 455/4.2, 5.1, 6.2; 370/92, 94.1, 60

[56] References Cited

U.S. PATENT DOCUMENTS

| Re. 31,735 | 11/1984 | Davidson | 358/124 |
|---|---|---|---|
| 3,746,780 | 7/1973 | Stetten et al. | 178/6.6 A |
| 4,439,784 | 3/1984 | Furukawa | 358/86 |
| 4,461,032 | 7/1984 | Skerlos | 455/4 |
| 4,499,568 | 2/1985 | Gremiller | 369/30 |
| 4,763,191 | 8/1988 | Gordon et al. | 358/86 |
| 4,780,757 | 10/1988 | Bryer et al. | 358/86 |
| 4,894,789 | 1/1990 | Yee | 348/10 |
| 4,987,486 | 1/1991 | Johnson et al. | 348/10 |
| 5,121,476 | 6/1992 | Yee | 348/10 |
| 5,130,792 | 7/1992 | Tindell et al. | 358/85 |
| 5,200,823 | 4/1993 | Yoneda et al. | 358/146 |
| 5,231,494 | 7/1993 | Wachob | 438/10 |

FOREIGN PATENT DOCUMENTS

| 288928 | 11/1988 | European Pat. Off. |
| 2619661 | 2/1989 | France |
| 2164229 | 3/1986 | United Kingdom |
| 2167629 | 3/1986 | United Kingdom |

Primary Examiner—Edward F. Urban
Attorney, Agent, or Firm—Geoffrey D. Green; David M. Rosenblatt

[57] ABSTRACT

One or more channels in a multi-channel cable television distribution system is used for the transmission of interactive television (ITV) signals in the form of packetized digital information from the cable system headend to subscribers. A converter at each subscriber location is connected between the cable system and the subscriber's television receiver. Such converter contains a receiver for the ITV channels. Control packets in the ITV signals are addressed to individual converters to enable the receipt of one or more virtual channels by a converter. The converter decodes and expands the packetized digital information in such enabled channels and generates a conventional video signal, which is transmitted to the subscriber's television receiver on one of the channels used for the ITV signal from the headend, replacing the packetized digital information. The remaining channels from the cable system are forwarded to such television receiver unaltered. Thus, all cable-ready features of the subscriber's television receiver are usable. In alternate embodiments of the invention, the video signal generated by the converter is derived from one or more sources. Examples of such sources are an additional receiver adapted to receive a conventional television signal from the cable system and local text or symbol generators.

8 Claims, 2 Drawing Sheets

MULTI-CHANNEL TELEVISION CONVERTER FOR CONVENTIONAL AND INTERACTIVE SIGNALS

TECHNICAL FIELD

This invention relates to interactive television systems and more particularly to a converter for subscriber locations of a cable television system to enable the use of interactive television features with cable-ready television receivers.

BACKGROUND OF THE INVENTION

Cable television systems have made possible the transmission of many channels of television programs to the homes of subscribers. Instead of being limited to the number of VHF and UHF channels that can be transmitted and received in a given area, the number of channels in cable systems is limited only by the transmission characteristics of the cable itself and the ability to compress the information in television programs into narrower-bandwidth channels. The advent of fiber-optic transmission systems for use in cable television networks has also vastly increased the number of channels available.

Such increase in channels has also given rise to proposals for interactive television systems wherein a subscriber can transmit information or requests back into the system, which information or requests may subsequently affect programs or information directed to such subscriber. There are a wide variety of applications for interactive television systems, such as video games, video catalog shopping, teaching systems, movies on demand and audio programs. Each application can be tailored for an individual subscriber, for example a subscriber may be able to select the language of the soundtrack in a movie. However, such systems typically require the ability (i) to control specific programs or information sent to each subscriber and (ii) to receive input messages or requests from the subscriber.

A headend-to-subscriber channel does not need the full bandwidth of the usual television cable channel if compression can be used. For example, a number of compressed and digitized television signals can be transmitted over a single conventional 6 Mhz cable channel. Other program information, such as high-fidelity audio, still video pictures or text can also be sent in compressed form. By using a large number of conventional channels for ITV purposes, such as is now possible with optical fiber distribution systems, together with compression, it is conceivable that hundreds of "virtual" channels could be made available. Such virtual channels can also be used to transmit control information to subscriber locations.

In many cable television systems, a special converter is used at the subscriber location to allow the subscriber to select among the various available channels, and possibly to "unscramble" premium channels for which extra fees are payable. Such converters usually provide an output on one of the channels that a standard television receiver can receive, such as Channel 3. More recently, television receivers and video recorders have been made available that are "cable ready," that is, with the ability to receive and select among all the channels transmitted over the cable system, but without the ability to unscramble premium channels. A converter is still needed for the premium channels.

Many cable-ready television receivers have additional features, such as picture-within-picture and remote-control tuning, that cannot be used conveniently with cable converters that provide an output over a single channel. Similarly, video recorders capable of being programmed to record selected channels at selected times are defeated by such a converter. Accordingly, it is desired to provide a converter for use in interactive television systems that is "transparent" to unrestricted channels on the cable system and that permits use of cable-ready features on television receivers and video recorders.

SUMMARY OF THE INVENTION

One or more channels in a multi-channel cable television distribution system am used for the transmission of interactive television (ITV) signals, in the form of packetized digital information, from a server at the cable system headend to converters at subscriber locations. Each converter contains a receiver for ITV signals and is connected between the cable system and the subscriber's television receiver. Control packets in the ITV signals arc addressed to individual converters to enable the receipt of one or more virtual channels by a converter. The converter decodes and expands the packetized digital information in such enabled channels and generates a conventional video signal, which is transmitted to the subscriber's television receiver on one of the channels used for the ITV signal from the headend, replacing the packctized digital information. The remaining channels from the cable system are forwarded to such television receiver unaltered. Thus, all cable-ready features of the subscriber's television receiver arc usable. In alternate embodiments of the invention, the video signal generated by the converter is derived from one or more sources. Examples of such sources are an additional receiver adapted to receive a conventional television signal from the cable system and local text or symbol generators.

These and other aspects of the invention will become apparent from the attached drawings and detailed description.

DETAILED DESCRIPTION

Figure 1:
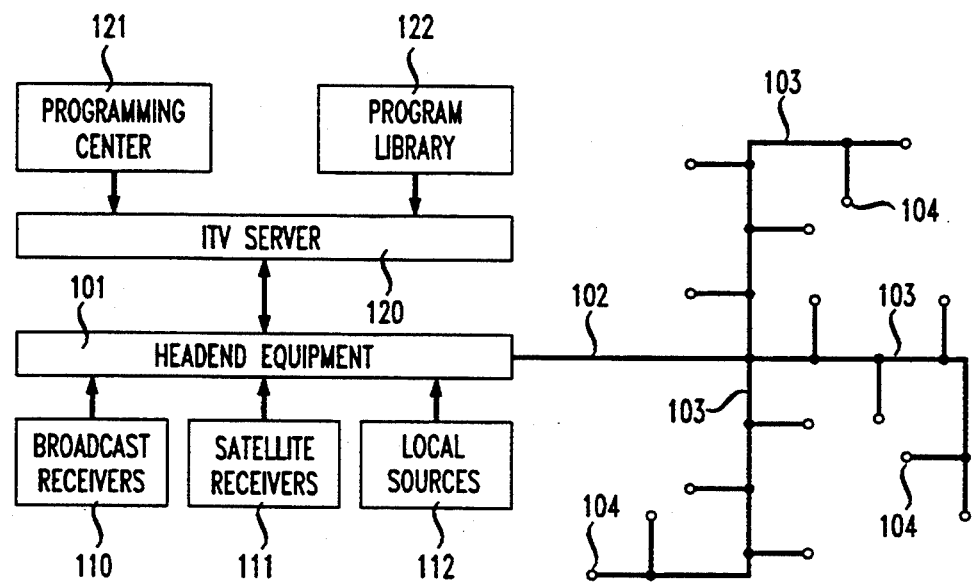
FIG. 1 is a schematic block diagram of a cable television system adapted for use by an interactive television system and in which a converter configured in accordance with the invention can be used.

FIG. 1 is a schematic block diagram of a cable television system adapted for use as an interactive television system and in which a converter configured in accordance with the invention can be used. A typical cable television system comprises headend equipment 101 at a central location, a distribution network consisting of various feeders 102 and branches 103 and connections to subscriber locations such as 104, where converters and television receivers (or cable-ready television receivers alone) receive the signals from the distribution network. In a typical cable television system, various television programs are fed into the different channels of the system by headend equipment 101. Such programs may be received, for example, from local broadcasts by broadcast receivers 110, from communications satellites by satellite receivers 111 or directly from local sources 112.

Interactive television (ITV) subscribers are served via dedicated distribution channels of the cable television system from ITV server 120. Server 120 obtains its programming material from such sources as programming center 121, or program library 122. Program library 122 contains stored versions of movies, musical selections, texts, pictorial information and other materials that may be accessed by ITV subscribers in conjunction with an ITV service or application. Programming center 121 may be a direct source of program material for server 120 or may prepare such material for library 122.

ITV server 120, programming center 121 and program library 122 may be at the same or different locations and may themselves be connected in networks. There can be multiple servers 120 for different cable systems. Program library 122 may consist of a number of libraries at different locations. However, there will typically be a server 120 dedicated to a particular cable system to interact with the ITV subscribers on that systems distribution network.

There are a wide variety of possible configurations for server 120, all of which will typically include at least one central processor to control programs and other information transmitted to subscribers 104 over the dedicated ITV channels in the cable system and to receive and respond to uplink messages from subscribers 104.

The interactive television converter (sometimes called a "set top box") of the invention is configured for use in a cable television system in which at least one distribution channel is dedicated to distribution of packetized digital information for use in conjunction with interactive television features. Packets can contain full-motion video signals in compressed form, other kinds of audio or video information or control signals for the converters. As used herein, the term "television signal" means a signal including both video and audio information. An uplink channel is also provided for communication of control signals from the subscriber to the cable-system headend. Alternatively, such uplink channel can be part of a separate system, such as a telephone network.

Using well-known compression techniques, a number of full-motion television signals can be transmitted in packetized form over a cable channel in a cable television system. For example, a full-motion NTSC television signal can be compressed and digitized for transmission at 1.5 Mbits/second. By packetizing such digital information and interleaving such packets, it is possible that as many as 16 such television signals (24 Mbits/second) can be sent via "virtual channels" in a standard 6 MHz cable channel. If a lower bandwidth signal (such as an audio signal) is to be sent over a virtual channel, fewer packets need be transmitted for such virtual channel per unit of time.

A typical packet consists of two bytes for a polling address, two bytes identifying the virtual channel of which the packet is a part and 48 data bytes. The data bytes contain the compressed video, audio or other information being transmitted in the virtual channel. One virtual channel (for example, channel 00) is reserved for control messages. A typical control message includes a field containing the address of the converter for which the message is intended, a field identifying the virtual channel to which the message relates, a field specifying the kind of data to be transmitted on such virtual channel (i.e. still pictures, full motion video, stereo audio, text) and other control information. A television signal is typically transmitted over two virtual channels: one for the video portion, the other for the audio. Control messages are also used to initialize converters.

Figure 2:
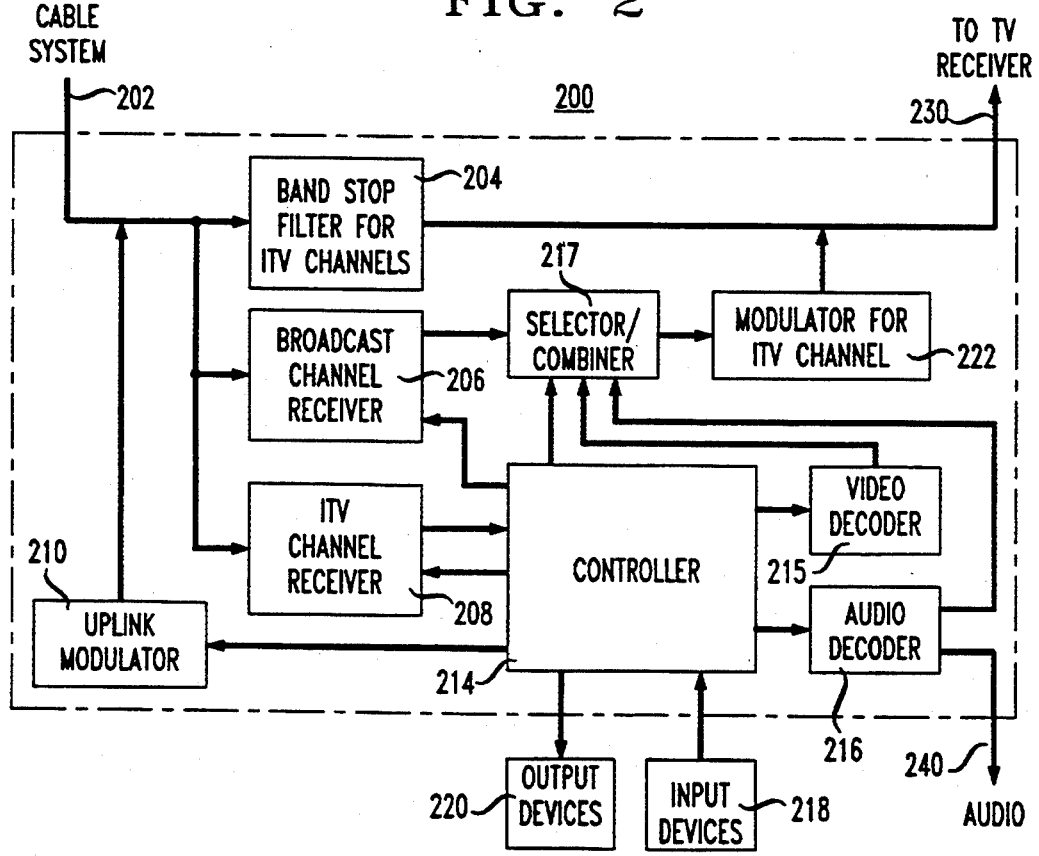
FIG. 2 is a block diagram of a converter in accordance with the invention for use at subscriber locations of an interactive television system.

FIG. 2 is a block diagram of a converter 200 for connection between a cable system and a television receiver at a subscriber's premises. Input cable 202 is typically a coaxial cable or an optical fiber cable connected to the cable distribution system. Cable 202 is connected to inputs of band-stop filter 204, selectable channel receiver 206 and ITV channel receiver 208 and to the output of uplink modulator 210. Cable 202 is part of an input circuit (not shown), that also contains any interface apparatus, such as optical/electrical transducers and amplification and buffering circuits needed to connect the cable system to filter 204, receivers 206 and 208 and modulator 210. Such interface apparatus and amplification and buffering circuits are well known to those skilled in the art.

ITV channel receiver 208 is tuned to receive the cable channel over which the packetized digital information for the interactive television features is being transmitted. The actual cable channel or channels used for such purpose are assigned by the administrators of the cable system. If more than one such ITV channel is provided, one of the channels is usually considered the "default" channel, which is the channel used to initialize converters such as converter 200. Upon initialization, a converter can be transferred to a different ITV channel by means of a control message. The output of tuner 208 is a digital bit stream comprising the packetized digital information, which is forwarded to controller 214.

Controller 214 performs many functions and is typically a microprocessor with both random-access memory (RAM) and read-only memory (ROM). Controller 214 sends control and video information to selector/combiner 217, sends control messages to receivers 206 and 208 specifying the identity of channels to be received, receives manual inputs from manual input devices 218, sends video packets to decoder 215 and audio packets to decoder 216 and transmits information to the cable headend via uplink modulator 210. An audio packet can contain information for more than one audio channel. Controller 214 can also be a source of audio and/or video information. Such information can be retrieved from memory in controller 214 or generated by computer programs in controller 214 under the control of messages from receiver 208 or input devices 218. Examples of such information are symbols, icons, text or other stored images to be used as video overlays, or synthesized sounds to be combined with audio signals. Examples of input devices 218 are keyboards, handheld "mice" for use with video displays and infrared remote control devices, such as those used with television receivers and recorders.

Decoders 215 and 216 can also be microprocessors, such as digital signal processors, specifically programmed to decode compressed video or audio information, as the case may be, in accordance with the appropriate decoding algorithm, as is well known in the art. Other output devices 220 capable of receiving digital information, such as a printer, can be connected to controller 214 as desired.

The output of selector/combiner 217 is a television signal the components of which can be either (i) selected from one of a number of sources, such as receiver 206, controller 214, decoder 215 or decoder 216 or (ii) combined from such sources. In its simplest form, selector/combiner 217 forwards to modulator 222 either the television signal received by receiver 206 or the television signal obtained by combining video decoded by decoder 215 with audio decoded by decoder 216. Other versions of selector/combiner 217 can include apparatus controlled by controller 214 to combine various video and audio sources into the television signal to be transmitted to modulator 222. Many techniques are known in the art for combining video sources, such as overlays, windows and split screens.

In a preferred embodiment of the invention, selector/combiner 217 operates on digital representations of video signals in which each pixel of a scene is represented by a number of bits and on digital representations of audio signals in which sounds are represented by digitized samples. In such embodiment, the outputs of decoders 215 and 216 and any audio or video outputs from controller 214 are in digital form; also, the television signal from receiver 206 is converted to digital form in converting apparatus (not shown). Such converting apparatus is well known in the art. These digitized video and audio elements are combined in selector/combiner 217 to produce a sequence of digital frames and digital audio samples (possibly for more than one audio channel). These samples are then converted to a conventional television signal, such as an NTSC signal, by apparatus (not shown) also well known in the art.

Band stop filter 204 deletes at least one of the ITV channels, preferably the default channel, from the signal received from cable 202, passing the remaining channels to output cable 230. Modulator 222 modulates the television signal received from selector/combiner 217 into one of the blocked ITV channels on output cable 230. Thus, converter 200 replaces the packetized digital signal received from the cable system in such ITV channel with the television signal from selector/combiner 217. Such ITV channel can then be selected and viewed in the conventional way on a cable-ready television receiver connected to output cable 230. As described above, the television signal modulated into such ITV channel can be produced from ITV packets received over any of the ITV channels.

For applications in which audio programs are transmitted over an ITV channel, a separate audio output can be provided, as shown at 240, which can be used by equipment such as a high-fidelity sound system. Such audio output can have more than one channel, if desired.

As mentioned above, each packet received in an ITV cable channel contains identification of a virtual channel. Program information can be "multicast" on virtual channels for receipt by one or more subscribers. As also mentioned above, control messages are sent over at least one of the virtual channels not being used for program information. Different types of programs can be transmitted in each virtual channel, for example full motion video, still pictures, audio or text. When converter 200 is to receive a program from a virtual channel, a control message addressed to converter 200 causes controller 214 to store the identification of such virtual channel. Thereafter, controller 214 processes the contents of each packet identified as part of such virtual channel. Moreover, controller 214 can be set to process information in more than one virtual channel, if desired. For example, the audio and video portions of a movie can be sent simultaneously on different virtual channels, possibly with soundtracks in different languages on different virtual channels.

Other uses of multiple virtual channels for a single subscriber can be sequential in nature. For example, it may be desired to transmit different sequences of program segments to different subscribers. To accomplish this, the segments are sent over different virtual channels in the correct time sequence, and the virtual channels corresponding to the sequence of segments for a particular subscriber are enabled for that subscriber. Transitions between segments are synchronized so that at the end of one segment the next begins. Multicasting in interactive television systems is described in more detail in U.S. patent application Ser. No. 08/056,974 entitled "System For Composing Multimedia Signals For Interactive Television Services", filed May 3, 1993.

Figure 3:
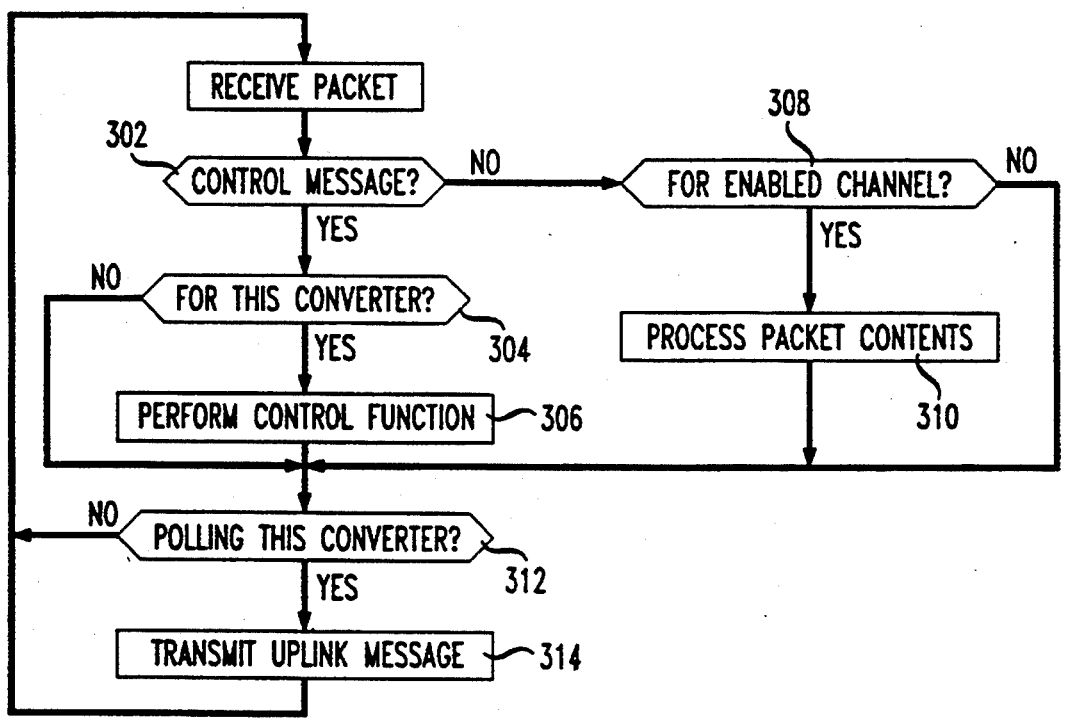
FIG. 3 is a flow chart showing the operation of controller 214 in FIG. 2 upon receipt of a packet of information from the cable system.

FIG. 3 is a flow chart showing the overall operation of controller 214 on receipt of a packet from receiver 208. If the "virtual channel" bytes indicate that such packet is a control message, (block 302) and the address field in the control message indicate that the message is intended for converter 200 (block 304), then controller 214 performs the control function specified by the remaining contents of the message (block 306). If the "virtual channel" bytes indicate that such packet is part of a program channel, such as a channel carrying an encoded and digitized video signal, and controller 214 is currently enabled to receive from such channel (block 312), then controller 214 processes the packet contents in accordance with the type of program in such virtual channel (block 310), sending data from the packet to the input buffer in the appropriate output device, such as decoder 215, decoder 216 or output devices 220.

Each packet in which the "polling address" bytes indicate that converter 200 is being polled (block 312) causes such converter to transmit an uplink message to the cable headend (block 314). (The address in the "polling address" bytes is not necessarily the same as in the address field in a control message that may be included in the same packet). This uplink message, typically no more than a few bytes, can contain control information or information entered manually by the subscriber in one of manual input devices 218. Because this message is initiated by a downlink message (from the headend to the converter) having a polling address known at the headend, this address can be associated with the uplink message when received, and there is no need to identify the source of uplink messages.

Uplink messages can be used for a number of purposes, particularly in interactive situations such as video shopping or video games where a subscriber may be operating a manual input device 218 such as a keyboard, joystick or mouse. Another important use for uplink messages is initialization of a converter when first connected to the cable system. The address of a particular converter can be preset, or set by control messages from the headend in an initialization sequence. Polling and the use of uplink messages for initialization and verification purposes are described in more detail in U.S. patent application Ser. No. 07/965,463 entitled "Initializing Terminals In A Signal Distribution System", now U.S. Pat. No. 5,373,288, filed Oct. 23, 1992.

As mentioned above, controller 214 can contain both RAM and ROM. The ROM includes computer programs that can be permanently loaded, such as initialization routines; whereas the RAM can be downloaded from the headend by the use of control messages. Such downloading will typically occur when a converter is first connected to the cable system or when programs must be updated. Also, different programs for different purposes can be downloaded in controller 214 at different times. Such downloading capability eliminates the need for program-loading capabilities at converter 200, although such capability could be provided if desired.

The usual mode of operation of a device such as converter 200 is expected to be that the virtual channels to be processed will be selected from the headend by means of control messages as described above. However, those skilled in the art will realize that embodiments of the invention are possible in which such selection is made directly at the subscriber's location, such as by input from an input device 218 to controller 214. That is, the invention can be used as nothing more than a way to augment the number of channels in a cable system by allowing a subscriber to access the virtual channels in a manner similar to that in which the subscriber accesses the conventional channels in a cable system.

Converter 200 forms a facility dedicated to the subscriber, and in many applications it will be most convenient to have the functions of converter 200 performed at the subscriber's location, as has been described. However, it is possible, and may be desirable for some applications, to perform all or part of such functions at a central location, for example, at the cable head end or in a telephone central office. Such an approach may permit sharing some of the functions and reducing the amount of dedicated equipment. However, for the kinds of applications presently contemplated, such an approach requires at least some equipment dedicated to each subscriber at the central location and dedicated channels from the central location to the subscriber for at least one video signal and stereo audio signals. In the case of a cable television system, such dedicated channels can be virtual channels as described above and converter 200 at the subscribers location can be simplified to receive and decode only such dedicated channels. All the functions relating to channel selection can be performed at the central location.

When a subscriber becomes inactive, the equipment and channels reserved for such subscriber can be reassigned to a new subscriber. Thus, dedicated equipment and channels are needed only for the number of subscribers expected to be active simultaneously.

The invention has been shown and described with reference to particular embodiments. However, it will be understood by those skilled in the art that various change may be made therein without departing from the spirit and scope of the invention.

What is claimed is:

1. A converter for use in a signal distribution system having a plurality of distribution channels, at least one of said distribution channels carrying digital signals in the form of a set of packets, said set of packets being related to a set of virtual channels by an identification of a virtual channel contained in each packet of the set of packets, the remainder of said distribution channels carrying other signals, which comprises:
   an input circuit for connecting said converter to said signal distribution system,
   a first receiver connected to said input circuit for receiving said channels carrying digital signals and retrieving said packets,
   a first memory for storing the identity of one of said virtual channels,
   means for comparing the virtual channel identification in each retrieved packet with said stored identity in said first memory and for selecting those of said packets in which said virtual channel identification matches said stored identity,
   means for decoding said selected packets to generate a decoded signal,
   a second memory for storing the identity of one of said distribution channels carrying other signals,
   a second receiver connected to said input circuit for receiving said other signal in the distribution channel whose identity is stored in said second memory,
   means for selecting between and/or combining said other signal from said second receiver and the decoded signal from said decoding means,
   an output circuit for connecting said converter to a receiver,
   means for connecting said input circuit to said output circuit and blocking at least one of distribution channels carrying digital signals without affecting said distribution channels carrying other signals, and
   means connected to said combining means and said output circuit for inserting the output of said selecting and/or combining means into said output circuit in one of said blocked distribution channels.

2. The converter of claim 1 wherein said digital signals are carried on more than one distribution channel and wherein said converter further comprises:
   a third memory for storing the identity of one of said distribution channels carrying digital signals,
   and wherein said first receiver is adapted to receive digital signals from said distribution channel whose identity is stored in said third memory.

3. The converter of claim 2 wherein each said packet contains the address of a converter and the packets in at least one of said virtual channels are control packets containing control information and wherein said converter further comprises:
   means for storing an address assigned to said converter,
   means for comparing the converter address in each said control packet with said assigned address in said address storage means and,
   means for performing the function specified in said control packet if the address in said control packet matches said assigned address.

4. The converter of claim 3 wherein certain of said control packets contain the identity of a channel to be received and wherein said means for performing further comprises:
   means for storing said channel identifies for virtual channels in said first memory, said channel identities for distribution channels carrying other signals in said second memory and said channel identities for distribution channels carrying digital signals in said third memory.

5. The converter of claim 1 wherein said signal distribution system is a cable television system, said other signals are television signals and the output of said second receiver is a television signal, said digital signals in at least one of said virtual channels represent a compressed and encoded video signal and said digital signals in at least one other of said virtual channels represent at least one compressed and encoded audio signal, wherein said means for decoding further comprises:

a first decoder for decoding said digital signals representing a compressed and encoded video signal to substantially recover the underlying video signal, and a second decoder for decoding said digital signals representing at least one compressed and encoded audio signal, the output of said first decoder and said second decoder being connected to said means for selecting and/or combining.

6. The converter of claim 5 which further comprises:

means for generating one or more video overlay signals, and wherein said selecting and/or combining means is adapted to select among and/or combine the television signals from said second receiver and said decoder and said one or more video overlay signals.

7. The converter of claim 6 wherein said video overlay signals and the video portion of said television signal from said decoder are digital representations of pixels and which further comprises:

means for converting the television signal from said second receiver into a digital representation of pixels and wherein said selecting and/or combining means is adapted to perform its function on a pixel-by-pixel basis.

8. The converter of claim 1 wherein said digital signals in at least one of said virtual channels represent one or more compressed and encoded audio signals and wherein said means for decoding further comprises:

a second decoder for decoding said digital signals representing one or more compressed and encoded audio signals to substantially recover the underlying audio signals and an audio output circuit connected to said second decoder for providing said recovered audio signals to utilizing means.

\* \* \* \* \*